US005901360A

United States Patent [19]

Kim

[11] Patent Number: 5,901,360

[45] Date of Patent: May 4, 1999

[54] AUTOMATIC ADJUSTMENT DELAY TECHNIQUE FOR SIMULCAST OF PAGING SYSTEM

[75] Inventor: Kon-Soo Kim, Gumi, Rep. of Korea

[73] Assignee: SamSung Electronics Co., Ltd., Suwon, Rep. of Korea

[21] Appl. No.: 08/752,257

[22] Filed: Nov. 18, 1996

[30] Foreign Application Priority Data

Nov. 16, 1995 [KR] Rep. of Korea .................. 1995-41673

[51] Int. Cl.[6] .................................................. H04B 7/00

[52] U.S. Cl. .......................................... 455/503; 455/38.1

[58] Field of Search .................................. 455/38.1, 502, 455/503, 13.2, 458; 370/350; 340/825.44

[56] References Cited

U.S. PATENT DOCUMENTS

| | | | |
|---|---|---|---|
| 5,239,671 | 8/1993 | Linquist et al. . | |
| 5,280,629 | 1/1994 | Lo Galbo et al. . | |
| 5,416,808 | 5/1995 | Witsaman et al. . | |
| 5,423,056 | 6/1995 | Linquist et al. . | |
| 5,481,258 | 1/1996 | Fawcett et al. . | |
| 5,483,665 | 1/1996 | Linquist et al. . | |
| 5,485,632 | 1/1996 | Ng et al. . | |
| 5,517,690 | 5/1996 | Linquist et al. . | |
| 5,519,759 | 5/1996 | Heineck et al. | 455/502 |
| 5,561,701 | 10/1996 | Ichikawa . | |
| 5,613,211 | 3/1997 | Matsuno | 455/502 |

*Primary Examiner*—Edward F. Urban
*Attorney, Agent, or Firm*—Robert E. Bushnell, Esq.

[57] ABSTRACT

An automatic adjustment delay technique for a simulcast of a paging system includes: a reference clock supplying unit for supplying a synchronization signal used as a reference clock, a page data transmission board installed within the paging system for receiving the page data and transmitting the page data in synchronism with the reference clock supplied from the reference clock supplying unit, a plurality of transmission lines and transmission facilities installed between respective base stations and the page data transmission board for transmitting the page data to the base stations, and respective transmitters installed within the respective base stations for receiving the page data transmitted via the transmission lines and transmission facilities and for externally transmitting the page data in synchronism with the reference clock generated by the reference clock supplying unit.

6 Claims, 9 Drawing Sheets

AUTOMATIC ADJUSTMENT DELAY TECHNIQUE FOR SIMULCAST OF PAGING SYSTEM

CLAIM OF PRIORITY

This application make reference to, incorporates the same herein, and claims all benefits accruing under 35 U.S.C § 119 from an application entitled Automatic Adjustment Delay Circuit For Simulcast Of Paging System And Method Thereof earlier filed in the Korean Industrial Property Office on Nov. 16, 1995 and assigned Ser. No. 41673/1995.

BACKGROUND OF THE INVENTION

1. Field of the Invention

The present invention relates to a simulcast technique which can prevent the reception ratio from being lowered due to a phase difference of signals generated by data transmission time differences from a base station at a signal overlapping area between base stations in a paging system having a plurality of base stations.

2. Description of the Related Art

Generally, in an earlier paging system, as shown in FIG. 1, page data is transmitted from a paging system 10 to transmitters 24 and 26 of base stations 20 and 22 connected via transmission lines 12 and 14 and transmission equipment 16 and 18, time delays between the transmission lines 12 and 14 and transmission equipment are generated. The deviation in the time delay depends on the characteristics of various respective equipment, and the time delay becomes different depending on the number of transmission equipment and the length of the transmission line. Because of the time delay, a plurality of transmitters 24 and 26, contained within a plurality of base stations, have a time deviation for each transmission time so as to generate the overlapping area of signals generated by the transmitters 24 and 26 of the respective base stations 20 and 22, as shown in FIG. 2. The signals received from the overlapping area 28 exhibit a phase difference between two signals received from a first base station and a second base station, as shown in FIG. 3. A signal distortion is generated at the overlapping area of two signals different in their phases, thereby lowering the reception ratio of a pager receiver 25.

An earlier technique for solving the problem that the reception rate is lowered at the overlapping area will now be described with reference to FIG. 4. First, a main transmission line 12 for transmitting page data and first and second reserve lines 32 and 34 are connected between a line delay time measuring device 30 installed within a paging system 10 and a line switching unit 46 installed within a first base station 20. The line switching unit 46 is controlled by a base station controller 44 installed in the first base station 20. The line delay time measuring device 30 transmits a command to the base station controller 44 so that loops between the main transmission line 12 and first reserve line 32 and between the main transmission line 12 and second reserve line 32 are connected, and then transmits predetermined data to measure each loop delay time. A method of calculating the measured loop delay time is explained as follows. Assuming that the loop delay time $T_{XY}$ between the main transmission line 12 and first reserve line 32 is 2000 μsec, the loop delay time $T_{XZ}$ between the main transmission line 12 and second reserve line 34 is 2500 μsec, and the loop delay time $T_{YZ}$ between the first reserve line 32 and second reserve line 34 is 2200 μsec, the delay time $T_X$ of the main transmission line 12 will be calculated as follows.

$$T_{XY}=T_X+T_Y \quad (1)$$

$$T_{XZ}=T_X+T_Z \quad (2)$$

$$T_{YZ}=T_Y+T_Z \quad (3)$$

Now, $T_X$ is obtained by manipulating the above noted simultaneous equations.

$$T_X = \frac{(T_{XY})+(T_{XZ})-(T_{YZ})}{2} = \frac{2000+2500-2200}{2} = 1150$$

It has been my observation that these types of systems inherently delay transmission of data. By way of explanation, $T_X$ is the delay time from the paging system 10 of the main transmission line 12 to the first base station 20, $T_Y$ is the delay time from the paging system 10 of the first reserve line 32 to the first base station 20, and $T_Z$ is the delay time from the paging system 10 of the second reserve line 34 to the first base station 20. As described above, the respective delay times from the main transmission line 12 to the plurality of base stations 20 are measured and then a reference value is set. Since the remainder obtained by subtracting the respective delay times from the reference value is the time delayed by the transmitters, all of the base stations can simultaneously transmit data. Therefore, in the case of three base stations, it is assumed that the delay time from the paging system 10 to a first base station is 2500 μsec, the delay time from the paging system to a second base station is 3000 μsec, the delay time from the paging system to a third first base station is 3500 μsec, and the reference value is set to 5000 μsec, the delay time of the transmitter of the first base station becomes 5000−2500=2000(μsec),the delay time of the transmitter of the second base station becomes 5000−3000=2000(μsec), and the delay time of the transmitter of the third base station becomes 5000−3500=1500(μsec). In accordance my observation, it is demonstrated therefore, that since the data is delayed constantly, i.e., by 5000μsec, to be transmitted from the paging system, irrespective of the delays of the transmission lines, the transmitters of the base stations can transmit data simultaneously.

I have found however, that according to such technology, a separate line delay time measuring device must be provided within the paging system to calculate the loss generated between the respective lines and transmitters. Also, a predetermined reference value is set and a delay time given in transmitting page data corresponding to the reference value. Thus, complex operations for calculating every transmission loss must be performed.

I have also found that, when the page data is transmitted from the paging system to base stations, the transmission loss is different for respective base stations. Thus, even if delay time is given using reserve lines, based on a reference loss, the transmission delay is not constant.

The following patents each disclose adjustment techniques for simulcast arrangements in paging systems but do not teach or suggest the specifically recited features of the present invention.

U.S. Pat. No. 5,416,808 to Witsaman, et al. entitled Apparatus For Synchronizing A Plurality Of Clocks In A Simulcast Network To A Reference Clock.

U.S. Pat. No. 5,481,258 to Fawcett, et al. Entitled Method And Apparatus For Coordinating Clocks In A Simulcast Network.

U.S. Pat. No. 5,561,701 to Ichikawa entitled Radio Paging System Having A Plurality Of Transmitter Stations.

U.S. Pat. No. 5,239,671 to Linquist, et al. entitled Simulcast Satellite Paging System With Provision For Signal Interruption.

U.S. Pat. No. 5,483,665 to Linquist, et al. entitled Simulcast Satellite paging System With Over Lapping Paging Reception Locales.

SUMMARY OF THE INVENTION

Therefore, it is an object of the present invention to provide an improved telecommunications system.

It is another object to provide to a system for automatically adjusting the transmission delay of transmitted page data by an automatic delay circuit incorporated in transmitters of a plurality of base stations connected to a paging system by supplying a reference clock to the plurality of base stations through a reference clock supply device and synchronizing the page data with the reference clock.

To accomplish the above object, according to the present invention, there is provided an automatic adjustment delay circuit for a simulcast of a paging system comprising: reference clock supplying means for supplying a synchronization signal as a reference clock to various parts, a page data transmission board installed within the paging system for receiving the page data and transmitting the page data in synchronization with the reference clock supplied from the reference clock supplying means, a transmission line and a transmission facility, installed between a base station and the page data transmission board for transmitting the page data to the base station, and transmitters for receiving the page data transmitted via the transmission line and transmission facility and externally transmitting the page data in synchronization with the reference clock generated in the reference clock supplying means.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
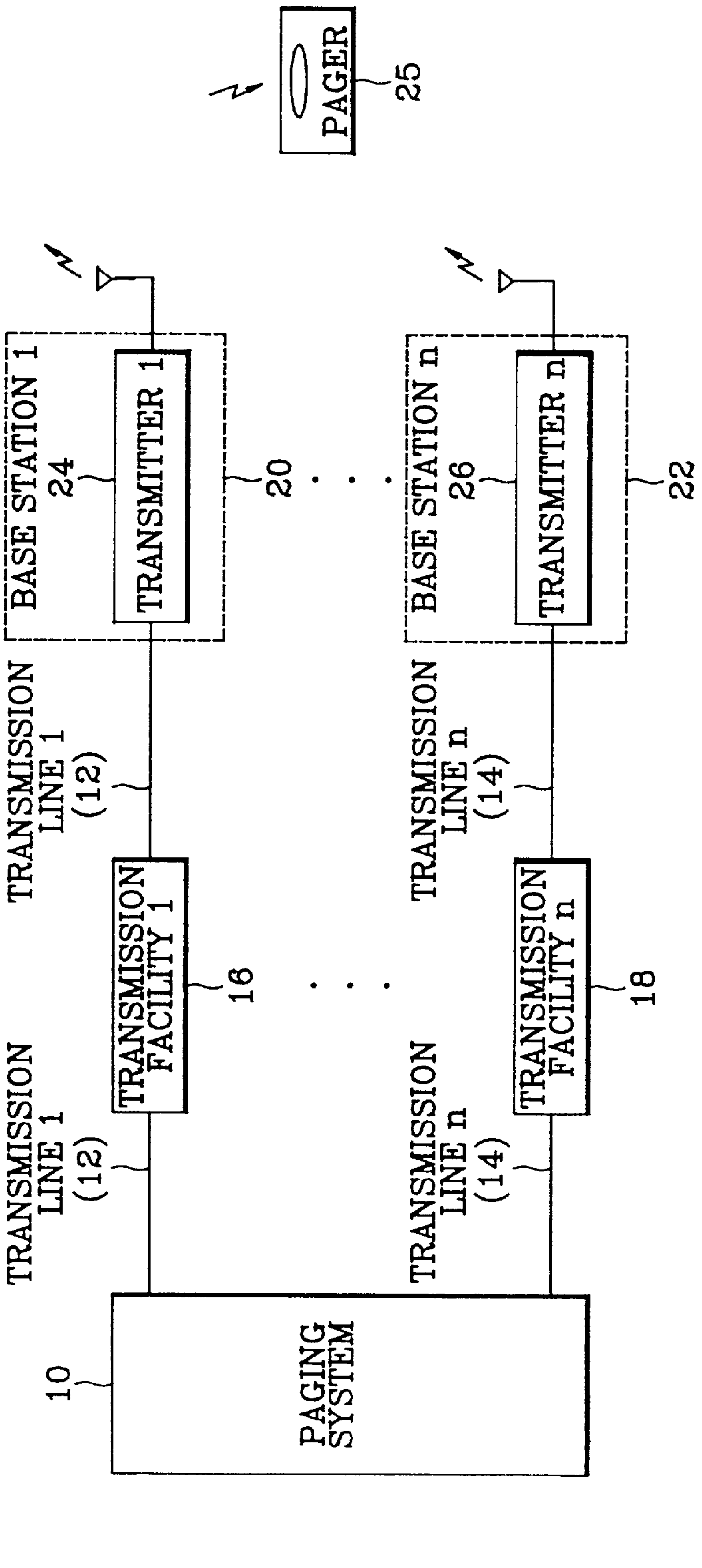
FIG. 1 is a schematic diagram of an earlier paging system.
Figure 2:
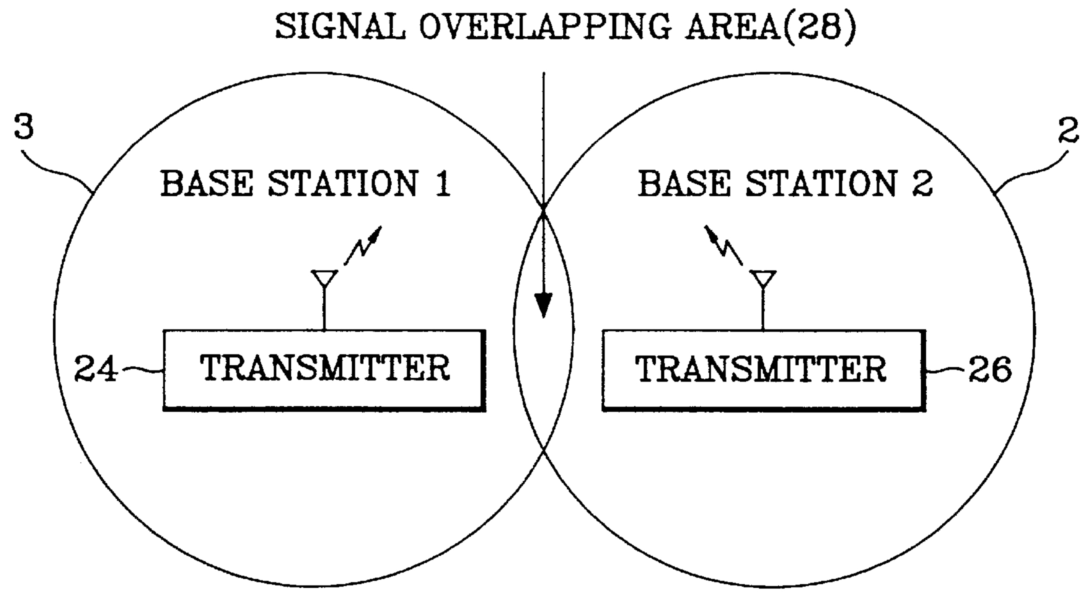
FIG. 2 shows service areas of base stations and a signal overlapping area in the earlier paging system.
Figure 3:
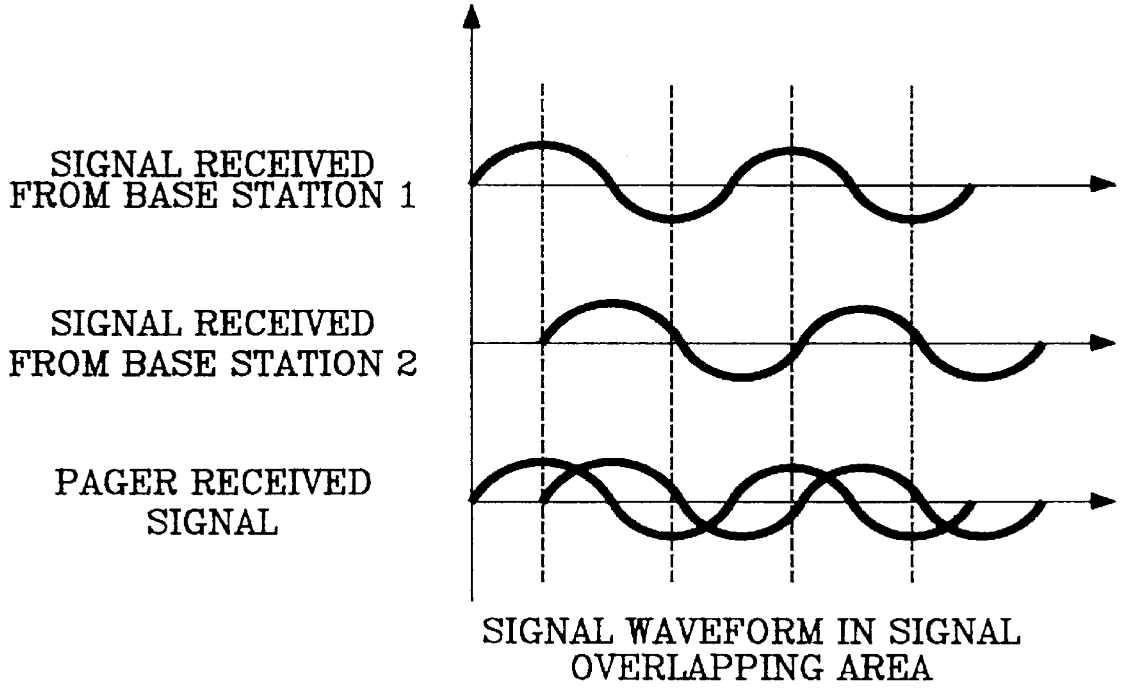
FIG. 3 shows waveforms of a signal receiving page data of the service areas of base stations and a signal overlapping area in the earlier paging system.
Figure 4:
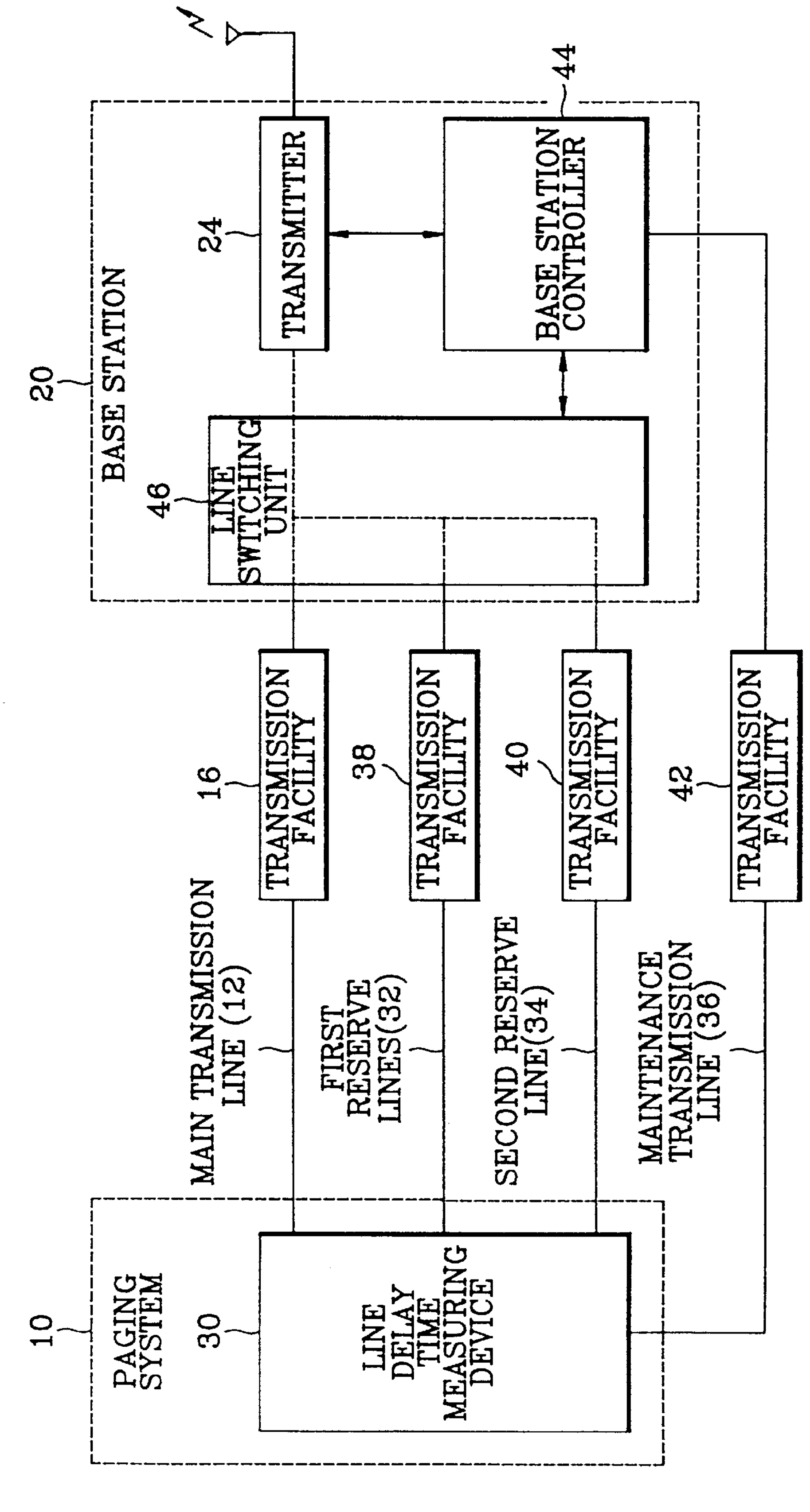
FIG. 4 is a schematic diagram of an earlier paging system for measuring the line delay time and base stations.
Figure 5:
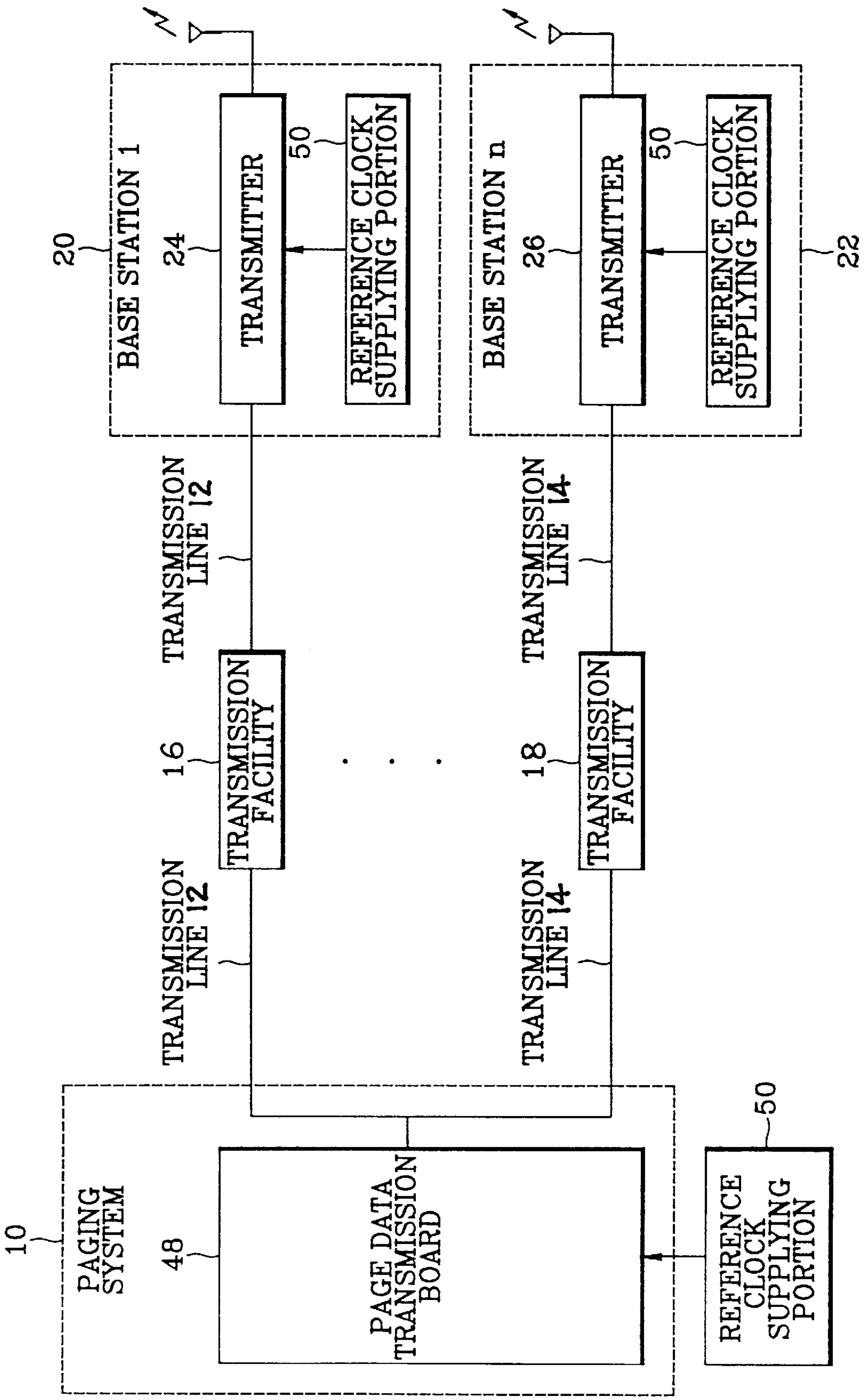
FIG. 5 is a schematic diagram of a paging system and base stations according to the present invention.

Referring now to FIG. 5, a paging system and a base station according to the present invention are constituted by a reference clock supplying portion 50 for supplying a synchronization signal used as a reference clock to various parts, a page data transmission board 48 installed within the paging system 10 for receiving the page data and transmitting the page data in synchronism the reference clock supplied from the reference clock supplying portion 50, transmission lines 12 and 14 and transmission facilities 16 and 18, installed between a base station and the page data transmission board 48 for transmitting the page data to the base station, and transmitters 24 and 26 for receiving the page data transmitted via the transmission lines 12 and 14 and transmission facilities 16 and 18 and externally transmitting the page data in synchronism with the reference clock generated by the reference clock supplying portion 50.

Figure 6:
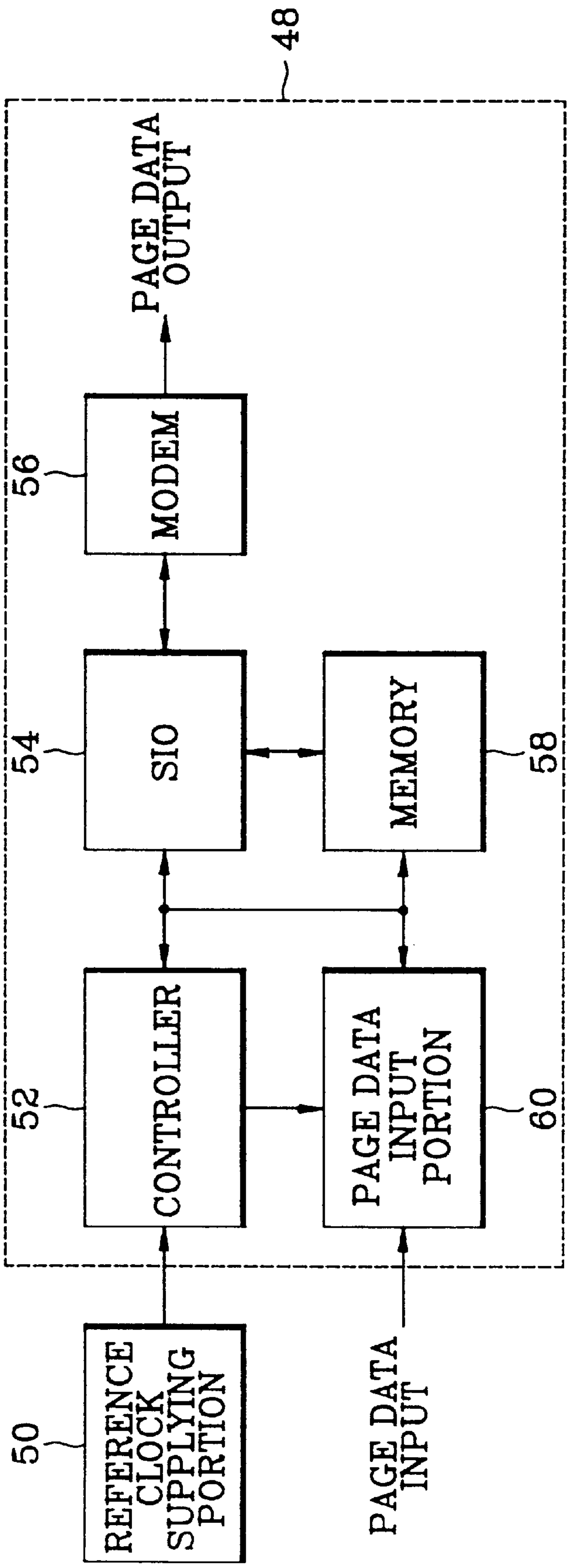
FIG. 6 is a block diagram illustrating a page data transmission board according to the present invention.

FIG. 6 is a block diagram of a page data transmission board according to the present invention. A controller 52 detects whether data to be transmitted to a memory 58 is stored when a reference clock is received from the reference clock supplying portion 50 to generate an interrupt, and transmits page data via a serial data input/output unit SIO 54 if the data has been detected.

Figure 7:
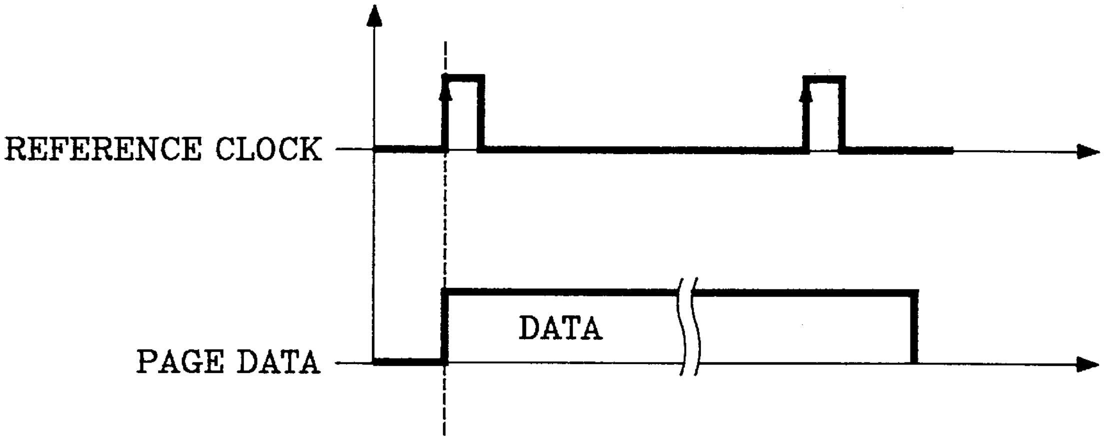
FIG. 7 is a timing diagram illustrating a page data transmission according to the present invention.

FIG. 7 is a timing diagram illustrating a page data transmission according to the present invention.

Figure 8:
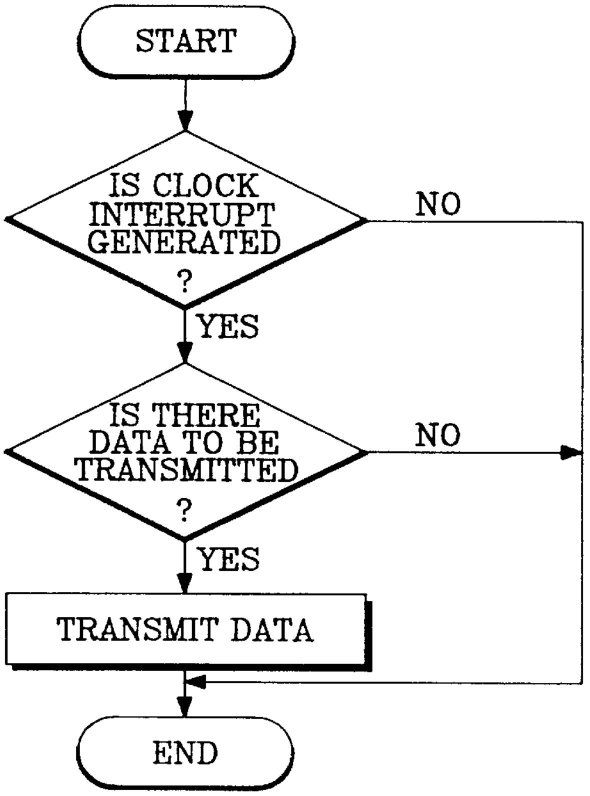
FIG. 8 is a flowchart illustrating a page data transmission according to the present invention.

FIG. 8 is a flowchart illustrating a page data transmission according to the present invention, including a first detecting step of detecting whether a clock interrupt is generated, a second detecting step of detecting whether there is data to be transmitted if the clock interrupt has been detected in the first detecting step, and a step of transmitting the data if there is data to be transmitted.

Figure 9:
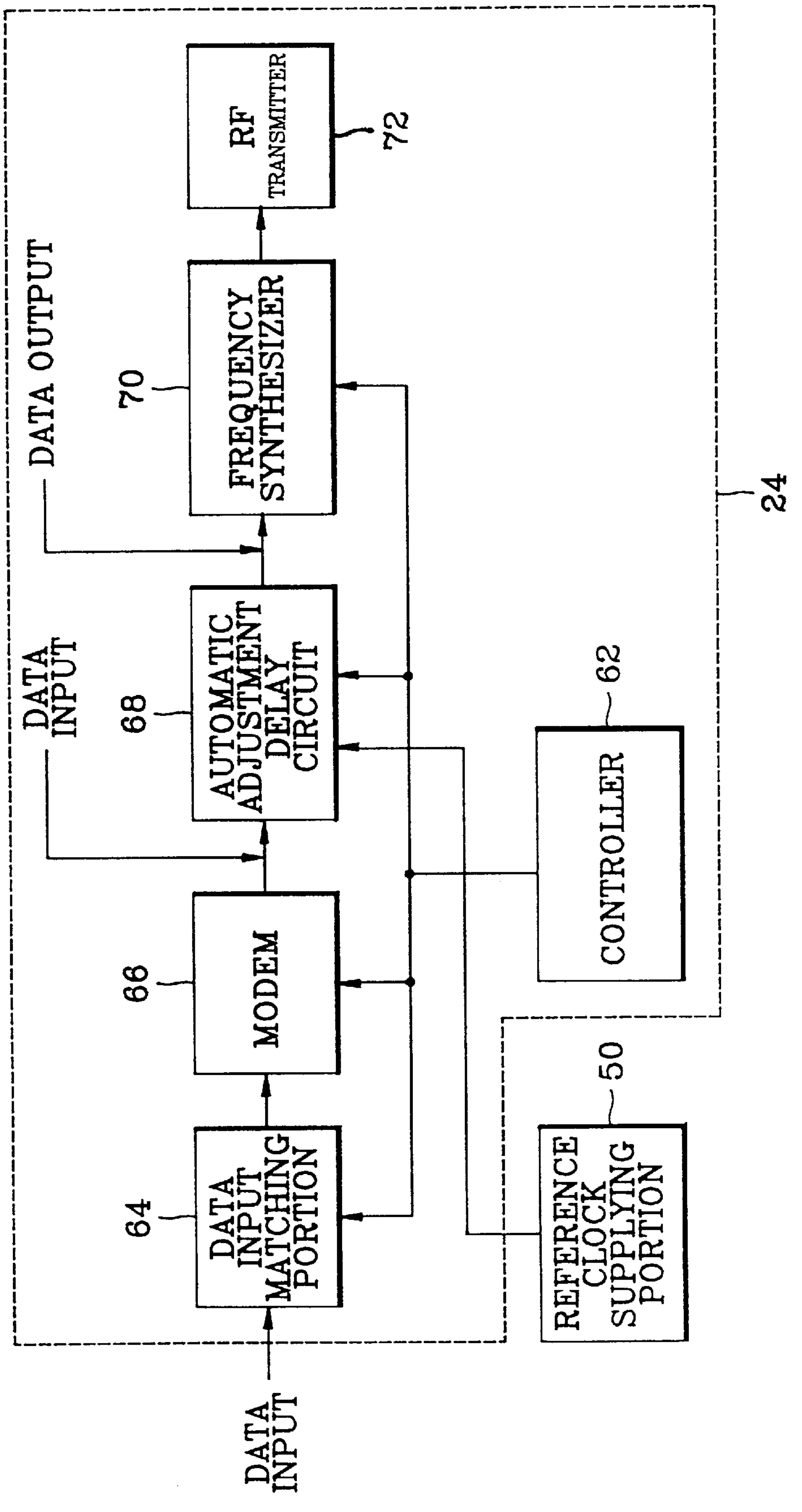
FIG. 9 is a block diagram of a transmitter according to the present invention.

FIG. 9 is a block diagram of a transmitter 24 according to the present invention, including a controller 62 for controlling various parts of the transmitter 24, a data input matching portion 64 controlled by the control signal from the controller 62 for matching page data if the page data is input from the paging system, a modem 66 controlled by the control signal from the controller 62 for modulating input page data if the page data matched from data input matching portion 64 is input, an automatic adjustment delay circuit 68 for automatically delaying data output in synchronism with the reference clock by receiving the page data output from the modem 66 as its first input and receiving the clock supplied from the reference clock supplying portion 50 as its second input, a frequency synthesizer 70 for receiving and frequency-synthesizing the data automatically delayed by the automatic adjustment delay circuit 68 and output therefrom, and a radio frequency (RF) transmitter 72 for transmitting the page data output from the frequency synthesizer 70.

Figure 10:
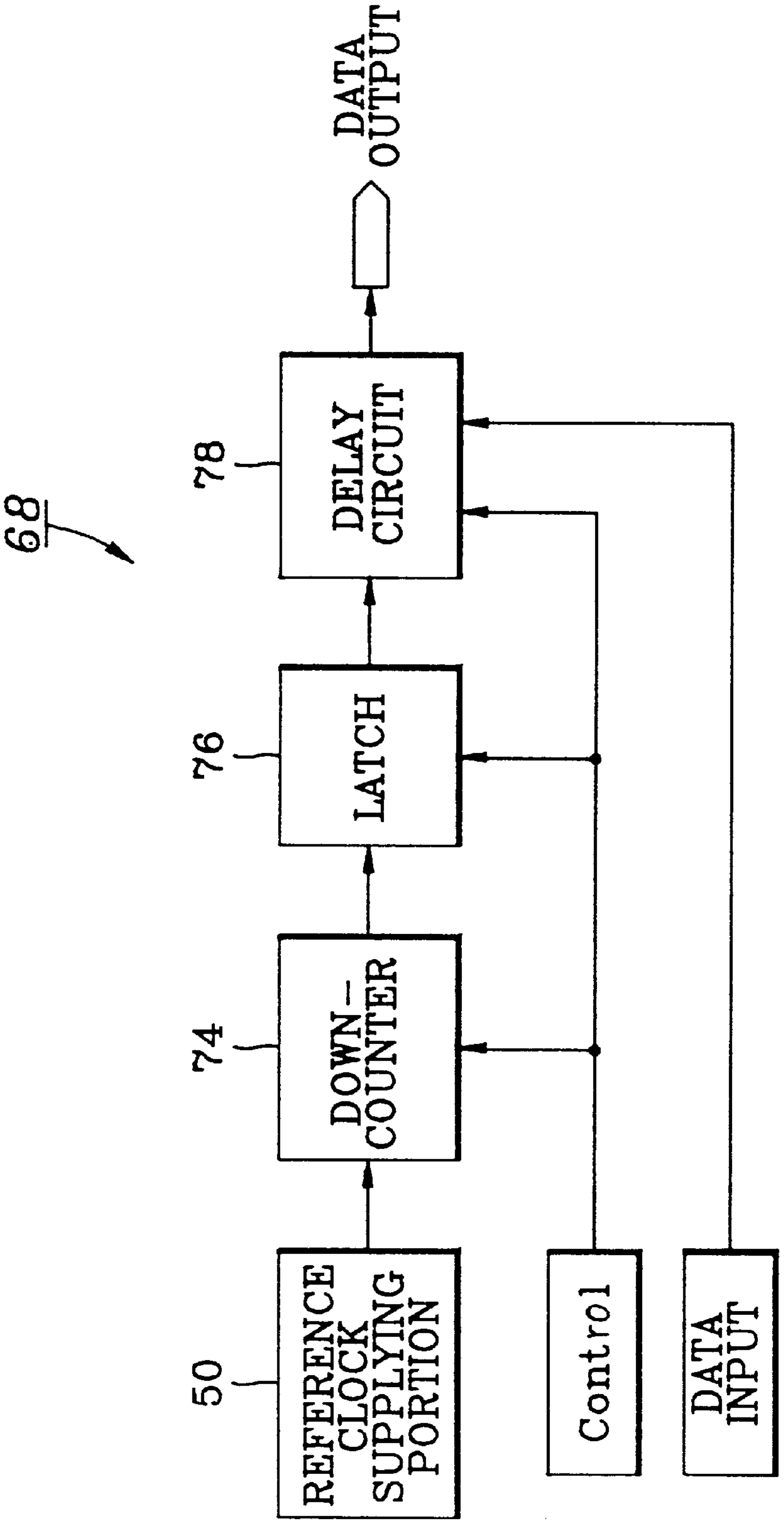
FIG. 10 is a block diagram of an automatic delay circuit according to the present invention.

FIG. 10 is a block diagram of the automatic adjustment delay circuit according to the present invention, including a down-counter 74 for counting input page data in synchronism with a reference clock, a latch 76 for latching a down-counted value counted by synchronizing the input page data with the reference clock, and a delay circuit 78 for delaying the page data by the amount latched in the latch 76.

Figure 11:
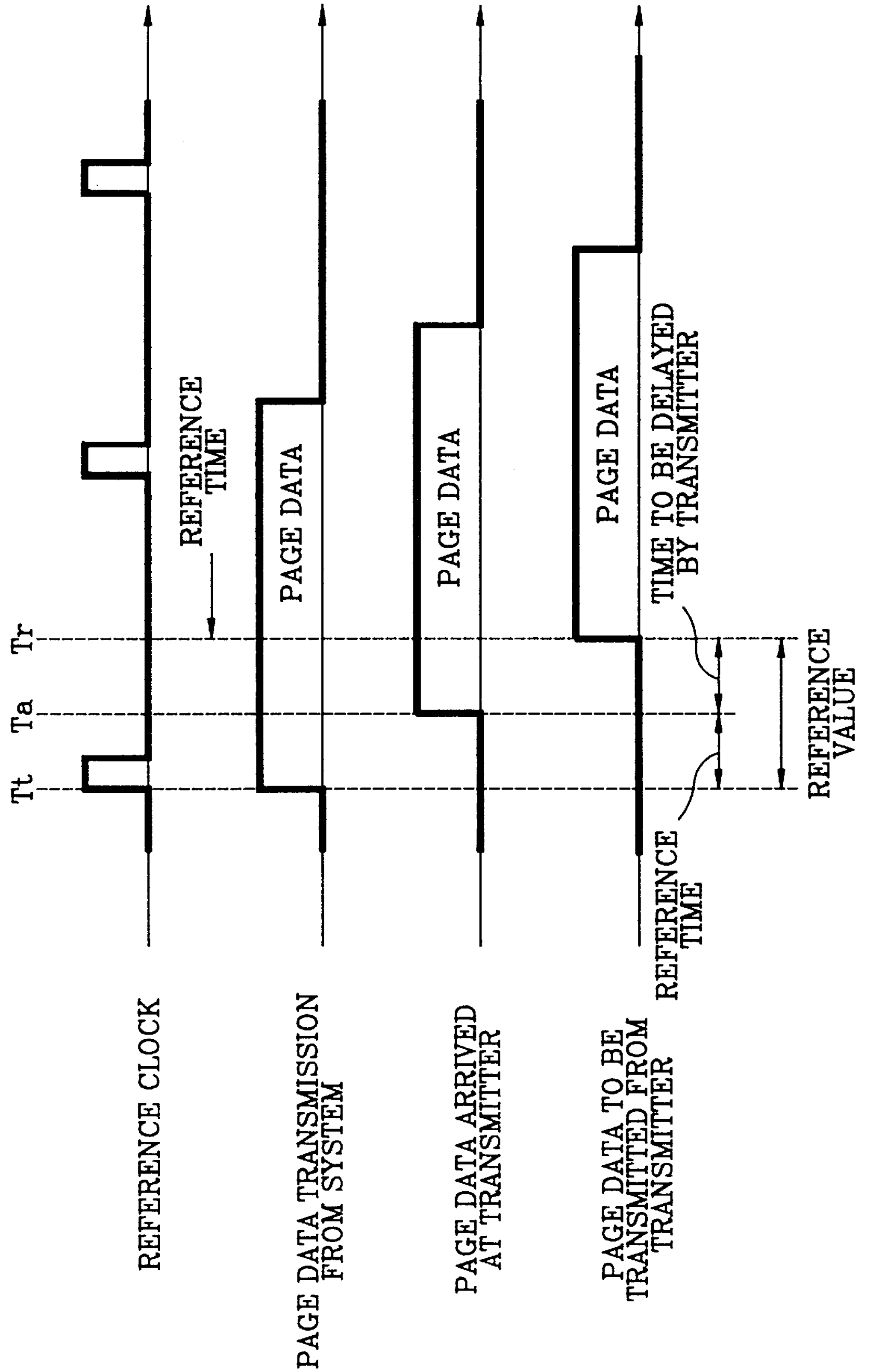
FIG. 11 is a timing diagram of an automatic delay circuit according to the present invention.

FIG. 11 is a timing diagram of an automatic adjustment delay circuit according to the present invention.

Hereinbelow, the present invention will be described with reference to the block diagrams of FIGS. 6, 9 and 10 and with reference to the waveform diagrams of FIGS. 7 and 11.

First, a synchronization signal used as a reference clock is supplied from the reference clock supplying portion 50 to a page data transmission board 48 of the paging system 10 and outputs the same in synchronism with the page data transmitted from the paging system 10 to the first base station 20. If a reference clock is input from the reference clock supplying portion 50 and an interrupt is generated, the controller 52 detects whether there is data to be transmitted to the memory 58. If there is data, the page data transmission board 48 transmits the page data through the serial data input/output unit 54. Then, the page data output through the serial data input/output unit 54 is transmitted to a plurality of base stations via the transmission lines 12 and 14 and transmission facilities 16 and 18. The transmitted page data is received from the first base station 20 and is applied to the transmitter 24 installed within the first base station 20 as its first input. Also, a reference clock generated from the reference supplying portion 50 installed within the first base station 20 is supplied as its second input of the transmitter 24. The reference clock is the same as that supplied from the paging system 10. If page data is input, the transmitter 24 outputs the input page data to the modem 56 after being matched in the data input matching portion 60. Then, the modem 56 receives and modulates the page data and outputs it to the automatic adjustment delay circuit 68. The automatic adjustment delay circuit 68 receives the input page data as its first input and receives the reference clock supplied from the reference clock supplying portion 50 as its second input to then adjust the synchronization of the input page data.

The operation of the automatic adjustment delay circuit 68 is as follows. If the reference clock is input from the reference clock supplying portion 50, the down-counter 74 counts time for the page data to arrive in the transmitter 24. The counted time is Ta (arrival time) shown in FIG. 11. Also, the value counted in the down-counter 74 is latched in the latch 76 to then be supplied to the automatic adjustment delay circuit 68 as its first input. At this time, the automatic adjustment delay circuit 68 delays the remainder obtained by subtracting the latched delay time from a predetermined reference time, i.e., the time to be delayed by the transmitter 24, which is designated as Tr (reference time) in FIG. 11.

Next, the page data output through the automatic adjustment delay circuit 68 is frequency-synthesized to then be transmitted to a receiver via the RF transmitter 72. T data is transmitted from the first base station 20 simultaneously with the other base stations.

As described above, the present invention provides a system for automatically adjusting the transmission delay of transmitted page data by an automatic delay circuit incorporated in transmitters of a plurality of base stations connected to a paging system by supplying a reference clock to the plurality of base stations through a reference clock supply device and synchronizing the page data with the reference clock. Therefore, the reception rate of a signal overlapping area can be enhanced and a simulcast system can be simplified.

What is claimed is:

1. An automatic adjustment delay circuit for a simulcast of a paging system, comprising:

a reference clock supplying unit for supplying a synchronization signal used as a reference clock;

a page data transmission board installed within said paging system for receiving said page data and transmitting the same in synchronism with said reference clock supplied from said reference clock supplying unit;

a plurality of transmission lines and transmission facilities, installed between respective base stations and said page data transmission board for transmitting said page data to said base stations; and respective transmitters installed within said respective base stations for receiving said page data transmitted via said transmission lines and transmission facilities and externally transmitting said page data in synchronism with said reference clock generated by said reference clock supplying unit;

wherein said page data transmission board comprises:

a controlling unit for detecting an interrupt signal generated in said reference clock supplying unit;

a memory unit controlled by a control signal generated from said controlling unit for storing page data; and a serial data input/output unit controlled by said control signal generated by said controlling unit for outputting said page data stored in said memory unit.

2. A transmitting circuit for a simulcast by a plurality of base stations, comprising:

a controlling unit for controlling said transmitting circuit;

a data input matching unit controlled by a control signal from said controlling unit for matching page data if said page data is input from a paging system;

a modem controlled by said control signal generated by said controlling unit for modulating input page data if said page data matched from said data input matching unit is input;

an automatic adjustment delay circuit for automatically delaying data output in synchronism with a reference clock by receiving said page data output from said modem as its first input and receiving said reference clock supplied from a reference clock supplying unit as its second input;

a frequency synthesizing unit for receiving and frequency-synthesizing the data automatically delayed by said automatic adjustment delay circuit and output therefrom; and a radio frequency transmitting unit for transmitting said page data output from said frequency synthesizing unit.

3. A transmitting circuit for a simulcast by a plurality of base stations, as claimed in claim 2, wherein said automatic adjustment delay circuit comprises:

a down-counting unit for counting input page data in synchronism with said reference clock;

a latching unit for latching a down-counted value counted by synchronizing said input page data with a reference clock; and a delay circuit unit for delaying said page data by the amount latched in said latching unit.

4. An automatic adjustment delay method for a simulcast of a paging system, comprising the steps of:

supplying a synchronization signal used as a reference clock with a reference clock supplying unit;

receiving said page data and transmitting the same in synchronism with said reference clock supplied from said reference clock supplying unit with a page data transmission board installed within said paging system;

transmitting said page data to said base stations with a plurality of transmission lines and transmission facilities, installed between respective base stations and said page data transmission board; and receiving said page data transmitted via said transmission lines and transmission facilities and externally transmitting said page data in synchronism with said reference clock generated by said reference clock supplying unit with respective transmitters installed within said respective base stations;

wherein said step of receiving and transmitting said page data by the page data transmission board comprises the steps of;

detecting an interrupt signal generated in said reference clock supplying unit with a controlling unit;

storing page data in a memory unit controlled by a control signal generated from said controlling unit; and outputting said page data stored in said memory unit with a serial data input/output unit controlled by said control signal generated by said controlling unit.

5. A method of transmitting with a transmitting circuit for a simulcast by a plurality of base stations, comprising the steps of:

controlling said transmitting circuit with a controlling unit;

matching page data if said page data is input from a paging system with a data input matching, unit controlled by a control signal from said controlling unit;

modulating input page data with a modem controlled by said control signal generated by said controlling unit if said page data matched from said data input matching unit is input;

automatically delaying, data output in synchronism with a reference clock with an automatic adjustment delay circuit by receiving said page data output from said modem as its first input and receiving said reference clock supplied from a reference clock supplying unit as its second input;

receiving and frequency-synthesizing the data automatically delayed by said automatic adjustment delay circuit and output therefrom with a frequency synthesizing unit; and transmitting said page data output from said frequency synthesizing unit with a radio frequency transmitting unit.

6. A method transmitting with a transmitting circuit for a simulcast by a plurality of base stations, as claimed in claim 5, wherein said step of delaying data output by said automatic adjustment delay circuit comprises the steps of:

counting input page data in synchronism with said reference clock with a down-counting unit;

latching in a latching unit a down-counted value counted by synchronizing said input page data with a reference clock; and delaying said page data by the amount latched in said latching unit with a delay circuit unit.

* * * * *